Patented Sept. 17, 1935

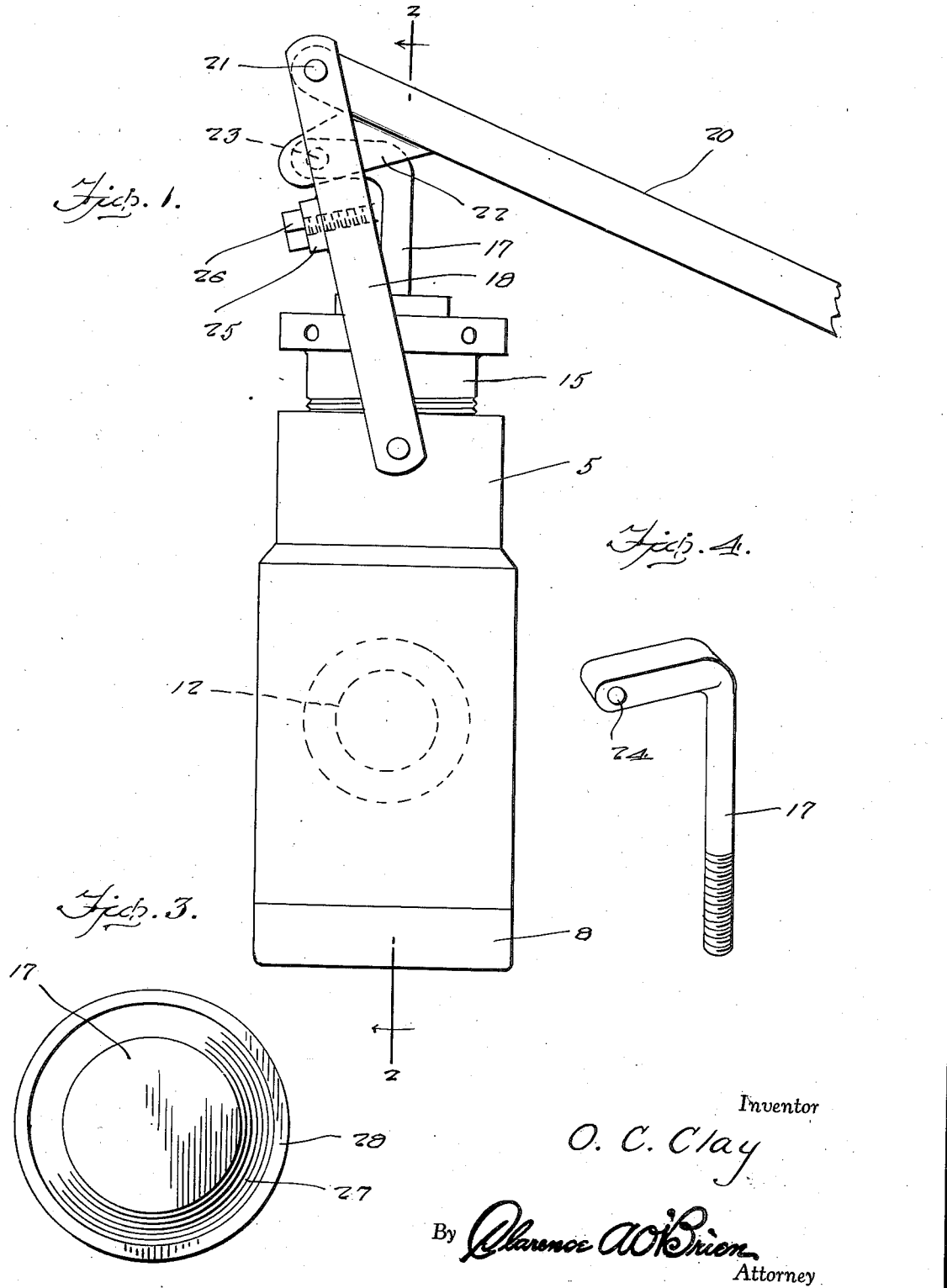

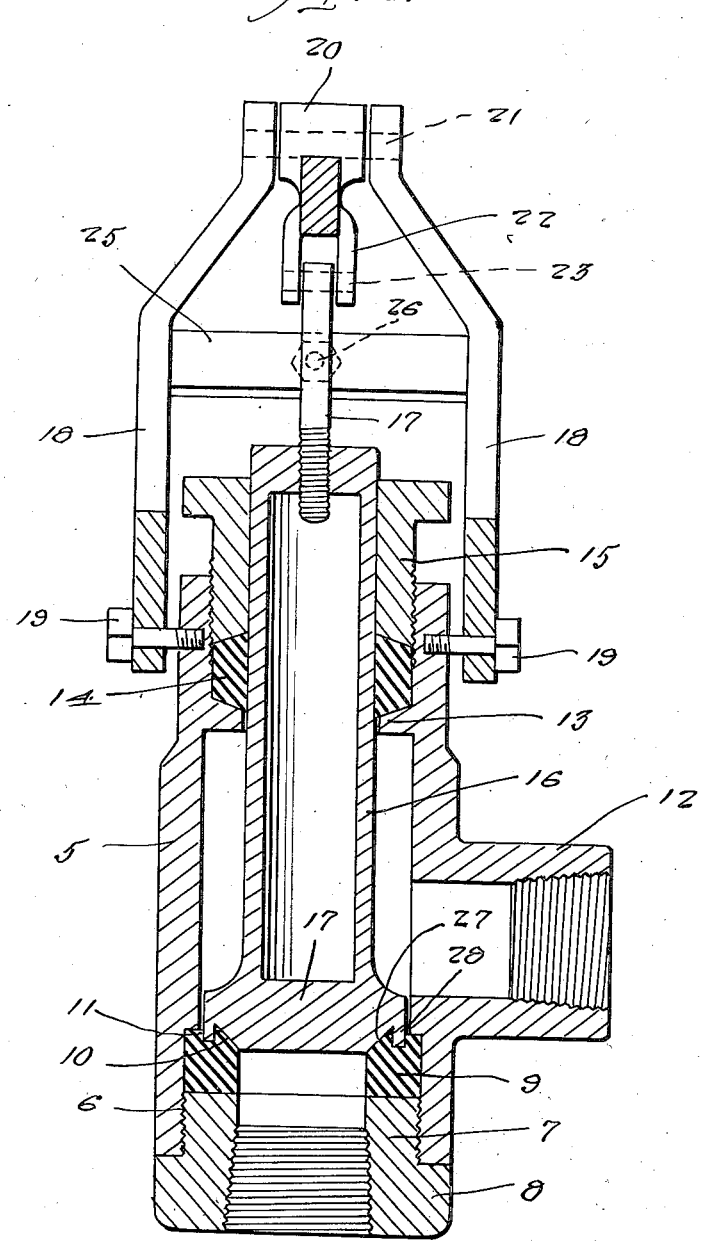

2,014,759

UNITED STATES PATENT OFFICE 2,014,759

HIGH PRESSURE VALVE

Ollie C. Clay, Oklahoma City, Okla.

Application January 16, 1935, Serial No. 2,104

1 Claim. (Cl. 251—41)

This invention appertains to new and useful improvements in valves and more particularly to a high pressure valve.

The principal object of the present invention is to provide a high pressure valve of simple construction and easy operation.

Another important object of the invention is to provide a valve which will be substantially foolproof in operation and which will take care of high pressures without likelihood of leak developments.

Other important objects and advantages of the invention will become apparent to the reader of the following specification.

In the drawings:

Figure 1 represents a side elevational view of the valve.

Figure 2 represents a vertical sectional view taken substantially on line 2—2 of Figure 1.

Figure 3 represents an end elevational view of the valve element.

Figure 4 represents a perspective view of the stem.

Referring to the drawings wherein like numerals designate like parts, it can be seen that the device consists of a shell 5 internally threaded at its lower end as at 6 to receive the reduced threaded portion 7 of the internally threaded adapter 8. The reduced portion 7 has the annular valve seat 9 mounted thereon, this valve seat being of resilient material and provided with a beveled seating face 10 and a circumferentially extending groove 11 in its upper portion. The outlet adapter 12 which is formed as an integral part of the shell 5 is internally threaded as shown in Figure 2. The upper end of the shell 5 is internally threaded and below these threads and at the inner side of the shell is the circumferentially extending shoulder 13 forming a part of a stuffing box which includes the resilient packing ring 14 and the sleeve or gland 15 which is threadedly engageable with the internal threads at the upper end of the shell 5. The top of the shoulder 13 as well as the lower end of the sleeve 15 is beveled to produce the usual distorting action of the ring 14. Slidably disposed through this stuffing box is the shank 16 carrying the valve head 17 at its lower end. This shank is of tubular construction and has a threaded opening through its upper end to receive the inverted L-shaped stem 17.

A yoke including a pair of leg members 18—18 is secured to the shell 5 by passing bolts 19 through the lower ends of the legs. The upper end portions of the legs converge inwardly and are connected with one end of the lever 20 by passing a pin 21 through the upper portions of the legs 18 and one end of the lever 20.

The last mentioned end of the lever 20 is provided with a diverged member 22 in the form of a yoke as shown in Figure 2 which straddles the upper end of the stem 17. A pin 23 is fed through the lower portion of the yoke 22 and through the opening 24 in the stem 17, thus pivotally connecting the member 22 with the stem 17.

A cross member 25 bridges the legs 18—18 and a set screw 26 is adjustable therethrough to coact with the stem 17.

Referring to the valve head 17, it will be seen that the lower portion is provided with a circumferential bevel 27 in engagement with the beveled surface 10 of the resilient valve seat 9 and depending circumferentially extending flange 28 for engagement into the circumferential groove 11 of the resilient seat 9.

While the foregoing specification sets forth the invention in specific terms, it is to be understood that numerous changes in the shape, size, and materials may be resorted to without departing from the spirit of the invention as claimed hereinafter.

What is claimed is:

A high pressure valve comprising a shell, an adapter extending into the lower portion of the shell, a resilient seat mounted on the adapter and provided with a circumferential groove therein and a beveled valve seating surface, a stuffing box in the upper portion of the shell, a valve element provided with a beveled surface for engaging the beveled surface of the seat and a depending circumferentially extending flange for engagement into the said groove of the seat, said valve element being provided with a cylindrical shank slidably disposed through the stuffing box, the upper portion of the shank being provided with an inverted L-shaped extension and a lever rockably mounted on the shell and pivotally connected to the upper end of the extension.

OLLIE C. CLAY.